United States Patent Office 3,620,059
Patented Nov. 16, 1971

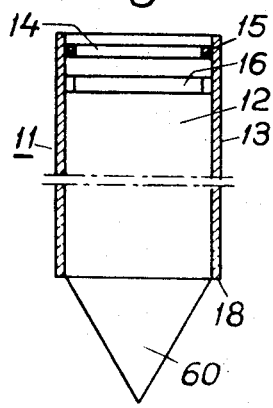
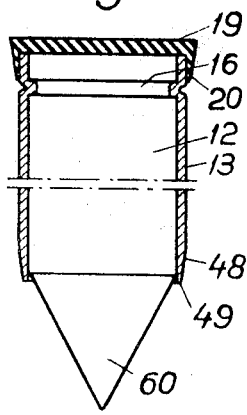
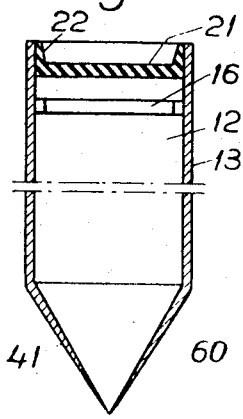
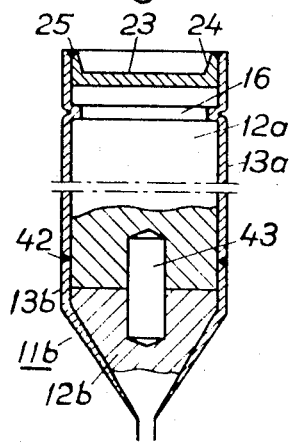
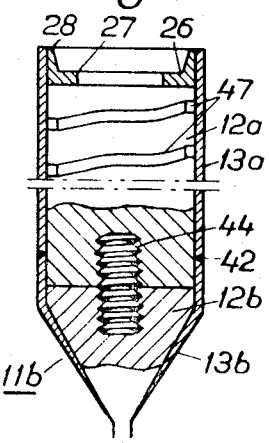
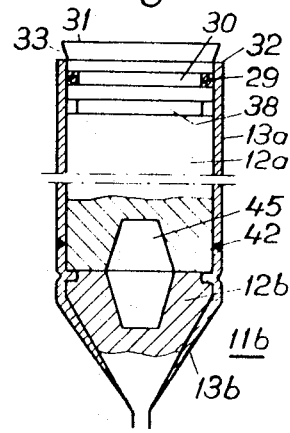
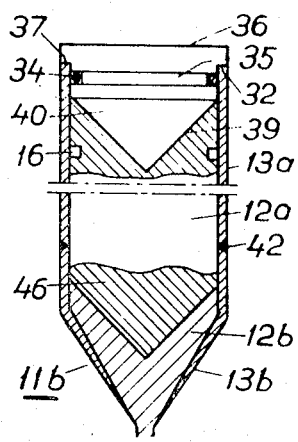

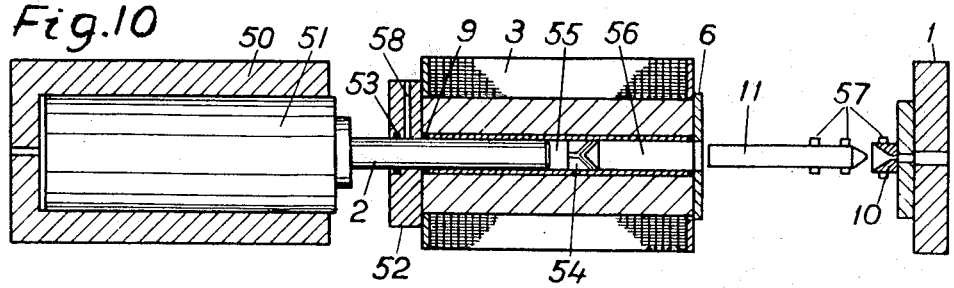
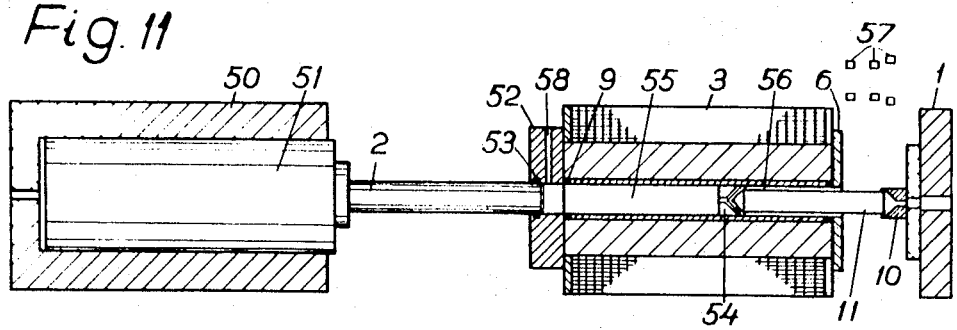
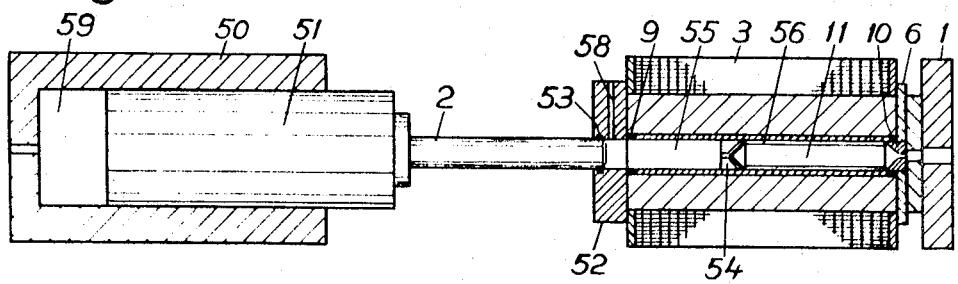
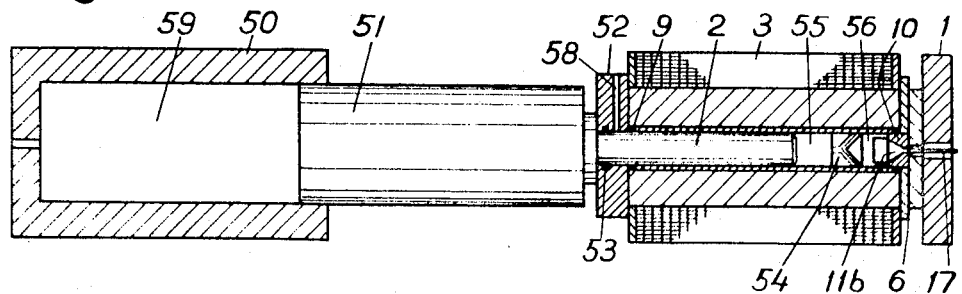

3,620,059
HYDROSTATIC EXTRUSION OF COMPOUND
MATERIAL
Jan Nilsson, Robertsfors, Sweden, assignor to Almänna
Svenska Elektriska Aktiebolaget, Vasteras, Sweden
Filed Sept. 9, 1968, Ser. No. 758,308
Claims priority, application Sweden, Mar. 15, 1968,
3,513/68
Int. Cl. B21c 23/22
U.S. Cl. 72—60                                  17 Claims

ABSTRACT OF THE DISCLOSURE

In hydrostatic extrusion of a wire or rod constituted by a casing of one material and a core of another, usually a softer material, a billet is extruded through a die from a pressure chamber provided with a conical surface, adjacent the die opening. The billet is so constructed that the axial forces created by the differences in molding resistance of the different materials are transferred between the casing and the core. This is done by pressing the rear end of the casing into a groove in the core. The joint between the casing and core is sealed at the rear ends. The front end of the core is shaped to match the conical surface of the die, and the casing may be brought down over this front end, the front end of the casing tapering in thickness. Successive casing and cores may be joined onto the remaining parts of casings and cores of a previous billet which has been largely extruded.

---

This application Ser. No. 32,195, filed Apr. 27, 1970, as a division of the present application. Such application Ser. No. 32,195 is based on an invention of Nilsson and Brustrom, with a Swedish Convention date of Sept. 27, 1967, prior to the Convention date of the present aplliction.

That application discloses an extrusion process in which a billet composed of a core and a casing is so constructed as to prevent fluid from entering between the core and the casing, thereby producing by the pressure of the extruding fluid on the casing a sufficient connection between the two is achieved to transfer forces between the casing and the core.

BACKGROUND OF THE INVENTION (1) Field of the invention

The invention relates to the production of a wire or rod of a hard material with a casing of one material and a core of another, usually a softer material by hydrostatic extrusion.

The prior art

It is known by means of hydrostatic extrusion to surround a wire or rod of a hard material with a casing of softer material. In the known method a wire or core is used which has a smaller diameter than the finished compound product and only the casing is reduced during the extrusion. The material for the casing is obtained from a substantially tubular casing through which the wire or rod forming the core in the finished product is threaded, after which the tubular casing is along its front part pressed tightly around the wire or rod while along the greater part of its length there will be an annular gap between the wire or rod and the casing. The pressure medium will thus be in contact with the surfaces which in the finished product should, if possible, be tightly joined. This means that layers may be formed on the surfaces which jeopardize the adhesion.

Attempts have also been made to manufacture wire or rod-shaped compound material with simultaneous area reduction of both core and casing in the billet used. The results have not been satisfactory. The reduction in core and casing has been different from billet to billet. Sometimes only the core or the casing has been extruded through the die.

The method seems to be of particular interest in the manufacture of copper-coated aluminum conductors for the electrical industry, but other combinations of material are feasible for other purposes. Aluminum is so much less expensive than copper and has such good electrical properties that there is a great demand for replacing copper conductors by aluminum conductors. Furthermore, the price of aluminum is stable whereas the price of copper varies considerably and in the long run is expected to increase more rapidly than the price of aluminum. When it comes into contact with air the surfaces of an aluminum conductor become rapidly coated with a thin electrically insulating layer of oxide which involves risks of bad contact at the joining points so that greater care and accuracy are required with the use of aluminum conductors than with the use of copper conductors. The junctions between aluminum conductors and copper conductors require special connection sockets or connection devices. Furthermore, the use of cables with aluminum conductors means that the store of cables and connecting devices must be doubled and to a certain extent special tools are required for joining conductors, for instance clamps for contact pressure. All this has meant that the resistance to the use of aluminum as a conducting material, particularly within the electricity distributing industry, is very great in spite of the fact that the difference between the prices of copper and aluminum is very great.

Attempts have been made to provide aluminum conductors with copper casing by welding copper strips around an aluminum rod and then drawing this rod to wire through a number of drawing dies. Until now this method has given a product with poor adhesion between aluminum and copper and with hard alloys of aluminum and copper in the contact layer which, amongst other things makes the drawing through the drawing die more difficult.

SUMMARY OF THE DISCLOSURE

The method according to the invention has made it possible to manufacture rods, wire and tubes of compound material by means of hydrostatic extrusion of a billet through an outlet opening in a die which is arranged in a pressure chamber. The method is essentially characterized in that the core and the casing in a billet consisting of a core of one or more materials and a casing of another material are combined so that the axial forces arising from the differences in moulding resistance of the different materials are transferred between the casing and the core and sliding between casing and core is thus prevented. This joining can be carried out in many different ways. In order to obtain an effective cohesion between core and casing it is essenttial that sealing means are applied to the billet to prevent the pressure medium from penetrating between the casing and core of the billet. Thus the pressure medium will press the casing with considerable force against the core so that solely through the friction between the core and the casing considerable axial forces can be transferred between the casing and the core. The core can with advantage be provided with an annular groove at its rear end into which a sealing ring, for example an O-ring is inserted. Sealing plates of elastomeric material or metal provided with flanges may also be placed over the end of the billet so that the flange projects in over the outer side of the casing and is sealingly joined to this.

When a plate of metal is used the sealing can be effected by joining the flange of the plate and the casing of the billet by means of welding or soldering or by inserting a sealing ring between the flange and the casing. The core can be placed in the casing in such a position that its rear end surface is at a distance from and completely inside the rear end surface of the casing so that a recess is formed. Into this a plate provided with a flange or a ring having L-shaped cross section can be inserted which seals against both the inner surface of the casing and the end surface of the core. Even when the end surface of the billet is shaped in this way a sealing plate of metal provided with a flange may be used and the sealing between the flange and the casing of the billet is effected by means of welding or soldering. It is also possible to use a sealing plate with an annular groove for a sealing ring, the plate being pushed down into the recess so that the sealing ring seals against the inner surface of the casing between the end surfaces of the core and the casing.

Since the pressure medium is prevented from penetrating between the core and casing of the billet it will press the casing against the core with considerable force, in the order of magnitude of 10–20 kbar. In certain cases the friction forces between core and casing will be so great that this is sufficient to join casing and core so that sliding between these elements is prevented during the extrusion. Usually, however, it is suitable to increase these forces in some way. With the use of the plate mentioned this improvement of the joining forces can be effected by shaping the core or the side of the plate facing the core so that the plate and the core together form an annular groove into which the casing is pressed by means of isostatic compression. With the other previously mentioned sealings the core is provided at its rear end with at least one annular groove into which the casing is pressed by means of isostatic compression. Instead of annular grooves, it is also possible to provide the core with at least one helical groove along a longer or shorter distance of the core or with a number of recesses along its circumference at one or more points along the length of the core. The isostatic compression can be effected by increasing the pressure to the level required for the extrusion, that is simultaneously with the extrusion process itself or as a separate operation from the extrusion.

The shape of the point of the billet is of considerable importance for the start of the compression and for the replacement of material. If the core is shaped with a conical point and with a casing having the same length as the cylindrical part of the billet and with even thickness, an unfavourable start is obtained with considerable waste. At the start a rod or wire of the core material is obtained and then a product of bad quality before a product having the correct thickness and quality of the casing is obtained. The starting process is improved and waste decreased if the casing is bevelled towards the point.

Furthermore a better sealing between casing and die is obtained if the contact surface is narrow. The best starting process and further reduced waste, and thus increased production, are obtained if the point of the billet is also surrounded by the casing and the thickness of the casing decreases evenly from the periphery to the point. The extrusion must be discontinued before a billet is completely extruded. According to the invention the remaining material can also be used so that production is further increased. This is particularly valuable when copper-aluminium is being extruded since a mixture of copper-aluminium waste has extremely low value due to the difficulty of separating copper and aluminium. According to the invention the material remaining from a previously extruded billet having the same shape as the die being used can be joined with a casing and a core to form a new billet. The casing of the remaining material and the new casing can be joined by means of welding and the new core pressed into the casing until contact is made with the core in the remaining material, after which the sealing means can be applied at the rear end of the billet. A flat joint between the new core and the core of the remaining material may mean that in the extruded product there will be a part where the strength of the core or its electrical conducting properties are reduced so that the section must be cut off. This disadvantage can be completely or partly eliminated by extending the joint axially. One end of the core may be shaped with a projecting part, for example a peg, cone, prism or the like and the other end of the core with a recess congruent with the projecting part. A satisfactory joint is most easily obtained by providing the new core and the core of the remaining material with at least one axially directed hole each and applying a peg which, when the parts are joined, projects both into the new core and into the core of the remaining material. The holes may be conical and the peg may be a double cone. The holes and peg may with advantage be threaded. In order to obtain products of unlimited length the product can be joined by means of the method while the remaining material is still in the die in the press stand.

The area reduction in hydrostatic extrusion, usually defined as $A_0/A$ where $A_0$ indicates the original area of the billet and $A$ that of the rod or wire obtained, should exceed 50 when copper is used in the casing and aluminium in the core. Usually the area reduction ratio is between 200 and 1000, preferably between 450 and 700.

The invention also relates to a billet for manufacturing rods or wire by means of the method described. In billets consisting of a core of one or more materials and a casing of another material the core and casing are joined so that axial forces can be transferred between the core and the casing. The joint is effected by providing the billet at its rear end, that is the end projecting furthest into the pressure chamber, with sealing means to prevent the surrounding pressure medium from penetrating between casing and core. Due to the influence of the pressure prevailing during the extrusion process a considerable contact pressure is thus obtained between the casing and the core so that an effective cohesion is obtained. The sealing means may be of different types and placed in different positions.

In one embodiment of the billet the core is provided at its rear end with an annular groove into which a ring is placed to seal between the casing and the core to prevent the liquid from penetrating between core and casing. In still another embodiment of the billet the rear end surface of the core is at a certain distance from the rear end surface of the casing and inside this so that a recess is formed with the casing as a wall around this. In the casing embodiment the sealing means may consist of a plate of elastomeric material provided with a flange which is applied with one side against the core and with its flange in resilient contact with the inner surface of the casing or by an L-shaped sealing ring inserted so that one flange is in contact with the core and the other with the inner surface of the casing. The plate provided with a flange may also be made of steel. The sealing between the flange of the plate and the casing may then consist of an unyielding sealing ring or of a soldered or welded joint which sealingly connects flange and casing. In certain cases it may be advisable to use a plate having a somewhat smaller diameter than the inner diameter of the casing and with an annular groove into which is inserted a sealing ring which seals between the plate and the casing when the plate is applied in said recess at the end of the billet.

In many cases the friction forces between casing and core are not sufficient to lock the core and casing in relation to each other. A stronger and more reliable adhesion of the casing and the core is obtained when the core or other members are provided with at least one groove or the like into which the casing is pressed. In the embodiment of the billet in which a plate with a groove for a sealing ring is used the side of the plate facing the core may be shaped with a part having a smaller diameter than the casing so that an annular groove is formed by the plate and the core. It is also possible so shape the end surface of the core facing the plate with a part having smaller diameter than the core otherwise and in this way obtain an annular groove which is formed between the core and the casing. The billet may also be provided with at least one annular helical groove or with a number of recesses at its rear end or with several grooves or recesses at several points along its length. Helical grooves can extend like a thread along the entire length of the billet. The casing may be pressed into the groove, grooves or recesses before it is inserted in the chamber for extrusion. The billet may also be provided with a rigid force-distributing plate at its rear end. This plate covers the end surfaces of both the core and the casing and sealings prevent pressure medium from penetrating between the plate and the billet. The sealing may comprise a ring which covers the joint between the plate and the casing or a lid placed over the end of the billet, the axially projecting part of the lid extending past and covering said joint. In order to position the plate the end surfaces of the core and the casing may be arranged at a distance from each other and one side of the plate may be shaped with a central projecting part of the same size as the core or a projecting edge, its periphery having the same thickness as the casing. In one embodiment of the billet the core is pointed at the front end, its shape closely following that of the inlet part of the die, and the casing is the same length as the cylindrical part of the core and the same thickness along its entire length. In another embodiment the casing is bevelled at its front part and has at the most a wall thickness which is only a fraction of the original, usually less than 25% of the original thickness, preferably less than 15% of this. In another embodiment the casing is drawn forwards and shaped so that it also covers the point of the core. In this embodiment it should suitably have a wall thickness decreasing towards the point.

Billets for manufacturing bus bars and wire for electrical connection equipment or conductors for cables have a core of pure aluminium or of an aluminium alloy and a casing of pure copper or of a copper alloy of the type which is currently used for rails and wire or copper or aluminium for similar purposes. The thickness of the casing may vary within very wide limits but is usually between 1–10%, preferably between 2–6% of the outer diameter. In view of the fact that copper is considerably more expensive than aluminium it is desirable to use the least possible quantity of copper and thus the thinnest possible casing which with the grades of material used produces a product of such quality that it can replace rods and wire of solid copper.

A billet having a point congruent with or fitting the surface of casing at the inlet of the die may consist of the material remaining from a previous billet which forms the point, a new casing joined to the casing of the remaining material, a core which is inserted in the casing to make contact with the core of the remaining material, and sealing means at the rear end of the billet to prevent pressure medium from penetrating between the core and the casing. The joint is suitably carried out by means of soldering or welding. One end of the core may be shaped with a projecting part such as a cone, prism or the like and its other end with a congruent recess. When the core is inserted to make contact with a core of the remaining material, it is directed so that a projection fits into a recess. In one embodiment both the core of the remaining material and the new core are provided with axially directed holes into which is inserted a peg which thus covers the joint between the end surfaces of the cores. The holes may be conical and the peg a double cone. The holes and peg may be threaded so that even greater improvement of the joint between the cores is obtained.

BRIEF DESCRIPTION OF THE DRAWINGS

The invention will be further described with reference to the accompanying drawings. FIGS. 3–9 show compound billets in various embodiments and FIGS. 10–13 show schematically a press stand for hydrostatic extrusion of compound material at four moments during the operating cycle.

DESCRIPTION OF THE PREFERRED EMBODIMENTS

Figure 1:
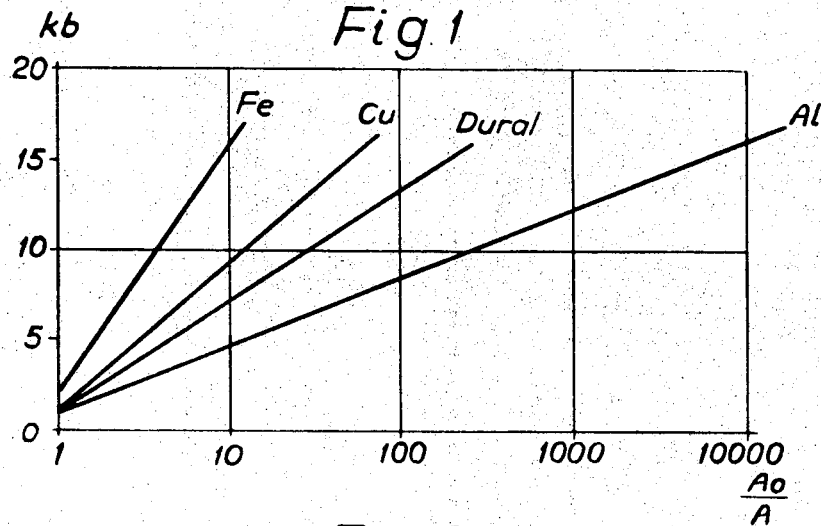
FIG. 1 shows the relation between the extrusion pressure $p$ and the area reduction ratio $A_o/A$.
Figure 2:
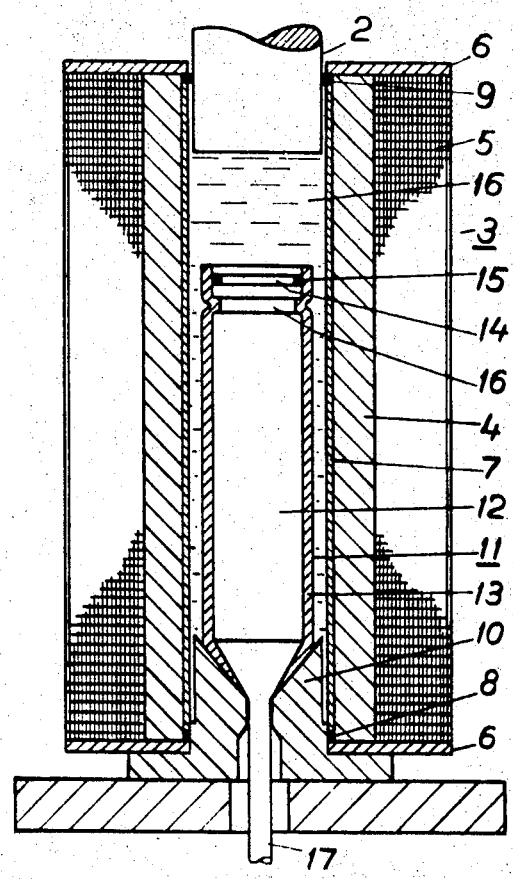
FIG. 2 shows schematically a section through a pressure chamber during extrusion of an inserted billet.

FIG. 1 indicates the relation between the extrusion pressure and the area reduction ratio for a steel, pure copper, hard aluminium and pure aluminium. The pressure $p$ is indicated on the vertical axis in linear scale and the area reduction ratio $A_o/A$ in logarithmic scale on the horizontal axis. The relation between pressure and area reduction ratio in this diagram is a straight line. The relation can thus also be expressed by the following equation:

$$p = k_1 + k_2 \log \frac{A_o}{A}$$

where $k_1$ and $k_2$ are constants depending on the material used.

From the diagram it is seen that the pressure must reach about 15 kebar for copper to be extruded at an area reduction ratio $A_o/A=80$. At the same pressure for pure aluminium an area reduction ratio of about 10,000 can be achieved. The difference in moulding resistance is thus considerable and has meant that extrusion of compound material has previously not given satisfactory results. For example, one of the component materials has been extruded more rapidly than the other so that the ratio between the areas of the component materials has varied along the length of a rod produced. The combination according to the invention of a casing and a core of different materials means that the same area reduction ratio can be achieved in both the component materials in spite of great differences in the moulding resistance. Area reduction ratios can also be obtained which have previously been considered practically impossible for a particular material, for instance an area reduction ratio of 400 for copper when this is included in a compound material. The extrusion of compound material, for example rods with a casing of one material around a core of another material, requires at a certain area reduction ratio an extrusion pressure which lies somewhere between the pressure required for extrusion of each of the component materials at the same area reduction ratio. Approximately the following relation between the pressures is valid:

$$P_k = \frac{A_x}{A_o} P_x + \frac{A_y}{A_o} \cdot P_y$$

where
$P_k$=the required pressure for extrusion of a compound material when the area reduction ratio is S
$P_x$=the required pressure for extrusion of a billet $x$ when the area reduction ratio is S
$P_y$=the required pressure for extrusion of a billet $y$ when the area reduction ratio is S
$A_x$=the area of the material $x$
$A_y$=the area of the material $y$
$A_o = A_x + A_y$ When extruding compound material having copper in the casing and aluminium in the core, it is possible from a billet with a copper casing having an external diameter of 200 mm. and a thickness of 6 mm., that is a copper area of 6% of the total area to produce a wire having a diameter of 10 mm., which is an area reduction ratio of 400.

The extrusion takes place at a pressure of between 12–15 kbar when copper and aluminium grades suitable for electrical purposes are being extruded. The casing may consist of annealed copper according to SIS 5010 and the core of aluminium according to SIS 4007. Castor oil is a suitable pressure medium.

The copper-coated aluminium wire produced according to the extrusion method described above has extremely good properties. During extrusion through the opening of the die the copper casing and aluminium core are forged or welded together so that the adhesion is extremely good when the area reduction ratio is sufficiently high. The wire can be drawn in drawing dies to the desired measurements or rolled to flat bus bars. The products can be bent, joined and otherwise treated in the same way as wire and rails now in use consisting of solid copper, without the copper casing becoming loose. It can thus to a very great extent replace rails and wire of solid copper. The saving is considerable since the copper area is only 5–20% of the total area.

In FIGS. 2–13, 1 designates a press platen and 2 a pressure-generating piston which is arranged in a hydraulic press, not otherwise shown, in which there is a cylinder to operate the piston 2. As pressure chamber a high pressure cylinder 3 is used which is constructed of a steel cylinder 4, a strip sheath 5 of rectangular tapes of great strength wound on under pre-stressing, and end walls 6. Between the end walls 6 and a spacing sleeve 7 in the cylinder are arranged seals 8 and 9 which provide sealing between the pressure cylinder 4 and the pressure die 10 and the piston 2, respectively. In the pressure chamber is a billet 11 consisting of a core 12 of, for example aluminium and a surrounding tubular casing 13, of for example copper. At the rear end of the core is an annular groove 14 into which is inserted a sealing ring 15, for example a so-called O-ring which prevents the pressure medium from penetrating between the casing and the core so that the pressure medium about the billet 11 will press the casing with considerable pressure against the core and effectively join core and casing so that axial forces can be transferred between core and casing. At the rear end of the core is another annular groove 16. The casing has been pressed into the groove 16 by isostatic compression while the pressure in the pressure chamber was being increased to the level required for the extrusion. In this way the adhesion between core and casing is further improved. A coated wire extruded from the billet 11 is designated 17.

FIG. 3 shows the billet 11 before insertion into the pressure chamber and thus before the casing 13 has been pressed into the groove 16. The core is here pointed and its point 60 has approximately the same acute angle as the conical inlet opening of the die 10. The casing 13 is positioned so that its edge 18 sealingly abuts the die at the start of the extrusion.

FIGS. 4–9 show other embodiments of the billet according to the invention. The billet according to FIG. 4 has as sealing means a plate 19 of elastomeric material with a flange 20 which resiliently grips the billet and seals against the outer surface of the casing 13. A similar plate of steel provided with a flange may also be used but then an elastomeric sealing is required between the flange and the casing or a sealing connection must be effected between the flange and the casing by means of welding or soldering. The core is provided with a point 60. The front part of the casing is provided with bevelling 48 so that the thickness at the front end surface 49 is only a fraction of the thickness of the rest of the casing. The casing 13 may be pressed into the groove by means of hydrostatic compression in a special properatory step. However, compression by means of rolling is also possible. In the embodiments according to FIGS. 5–9 the rear end surface of the core 12 lies inside the end surface of the casing 13. The sealing means are applied in the recess formed at the end of the billet. In FIG. 5 sealing is provided by a plate 21 of elastomeric material provided with a flange 22 which resiliently abuts the inner surface of the casing, in FIG. 6 by a plate 23 of metallic material, the flange 24 of which is sealingly joined to the casing by a weld 25 or a soldered joint, in FIG. 7 by a sealing ring 26, the flanges 27 and 28 of which sealingly abut the end surface of the core 12 and the inner surface of the casing 13, respectively, in FIG. 8 by a sealing ring 29 which is inserted in a groove 30 in a plate 31 which projects outside the end surface 32 of the casing 13 and is shaped on the projecting part with a conical surface 33 and in FIG. 9 by a sealing ring 34 in a groove 35 in an end piece 36 which projects outside the end surface 32 of the casing 13 and is shaped with a piece 37 facing the end surface 32 of the casing. In the embodiment according to FIG. 8 either the plate 31 or the core 12 has a section having smaller diameter than the inner diameter of the casing 13 so that a locking groove 38 is formed at the dividing surface into which groove the casing can be pressed to join together the casing and the core. In the embodiment according to FIG. 9 the rear end of the core is shaped with a conical recess 39 and the end piece 36 has a conical projecting part 40 fitting this recess. All the billets shown may have cores having annular locking grooves instead according to FIGS. 5–6 and FIGS. 8–9 or one or more helical locking grooves 47 as shown in FIG. 7.

When the billets according to FIGS. 3 and 4 are used a product is obtained at the start of the extrusion which consists only of core material and only later a product with a casing of the desired thickness. The waste is therefore considerable as both the product first obtained and the remaining material will be waste. Particularly when extruding copper-aluminium the disadvantages are of great economical importance since copper waste with aluminium or aluminium waste with copper has very low value in comparison with pure waste material of either metal. The waste can be considerably reduced, substantially to only the remaining material, if the point is shaped in the manner shown in FIG. 5 with a casing forming a conical point 41 which covers the point 17 of the core. If the point 41 is shaped so that the thickness decreases the connection to the cylindrical part of the casing to the point, usable products can be obtained right from the start of the extrusion. Further decrease in the waste is obtained by using a remaining billet 11b as the point of a new billet by joining the casing 13b of the remaining material with a new cylindrical casing 13a by means of a weld 42 and then pressing a new core 12a into the casing to make contact with the core 12b of the remaining material and applying the sealing means at the rear end of the billet. By inserting a peg, suitably of the core material, at the joining point between the new core 12a and the core 12b of the remaining material, the peg projecting into both the cores, or by shaping the cores so that, for example, the new core 12a projects into the core 12b of the remaining material, the finished product is improved at the section formed by the material at the joining point. Only one part of the surface of the core in the finished product then has reduced strength or electrical conducting properties at the joining point.

FIG. 6 shows a joint with a plain cylindrical peg 43, FIG. 7 a joint with a threaded cylindrical peg 44 and FIG. 8 a joint with conical holes in the core parts 12a and 12b and a peg 45 in the form of a double cone. FIG. 9 shows how a joint can be effected merely by shaping the core in a suitable manner. The front end of the core is provided with a point 46 and the rear end with a congruent recess 39 so that the new core 12a will project into the recess in the core 12b of the remaining material.

Any of the billet points according to FIGS. 5–8 can with advantage be combined with any of the sealing arrangements shown in these figures.

If the extruded product is to be of even and high quality, that is with satisfactory surface finish and good cohesion between copper and aluminium, the casing and core of the billet must be well cleansed. Oxide layers formed during annealing, and descaling on the surface of the copper casing, must be removed by, for example, by pickling in hydrochloric acid. Furthermore, both the casing and the core should be sandblasted before being joined together to form a billet.

The front part of a remaining billet has been treated due to the extrusion so that particularly the copper casing has increased hardness. This means that the start of an extrusion process where the remaining billet is used as point of the new billet is more difficult and the starting pressure must be very high. It is therefore more suitable if the remaining material is treated, for example annealed, so that the hardness is decreased in the copper casing. This treatment must be carried out in such a way that no damaging layer is formed at the contact surface between copper and aluminium.

An operating cycle for manufacturing wire of compound material according to the invention is described more fully with reference to FIGS. 10–13. In these figures the operating cylinder 50 of the press is also shown with a piston 51 to which the pressure-generating piston 2 is joined. The high pressure cylinder 3 shown is provided with a thick end wall 52 with a low-pressure seal 53 and a billet stand 54 in the form of a piston freely movable in the high-pressure cylinder and having a built-in overflow valve through which pressure medium can flow, during a pressure drop determined by the valve, from the space 55 on its left side to the space 56 on its right. The press stand is provided with a manipulator for inserting the billet and die. Only the gripping means 57 of the manipulator is shown. When the operating cycle starts, the cylinder 3 and pistons 2 and 51 are in their lefthand limit positions as shown in FIG. 12. A billet 57 and a die 10 are inserted by the manipulator into the press after which the cylinder 3 is moved to the right to the position shown in FIG. 13. Hydraulic medium is then pumped into the space 56 through the channel 58 and displaces the piston 54 to the right so that this presses the billet 11 towards the die 10 and the die towards the platen 1 so that billet and die remain in their positions due to the axial force. The gripping means of the manipulator releases its grip on the billet and the die and the manipulator arm is moved away. The cylinder 3 and the pistons 2 and 51 are now moved simultaneously to the right until they reach the positions shown in FIG. 14. More pressure medium is supplied to the space 59 in the cylinder 50 so that the piston 2 is pushed into the cylinder 3. When the front end of the piston 2 passes the high-pressure seal 9 the piston compresses the pressure medium enclosed in the spaces 55 and 56 so that the pressure is increased to the level required for the extrusion and a rod or a billet 17 is formed. Extrusion is interrupted before the billet is completely used. Operating cylinder and pistons are returned to their lefthand limit positions as shown in FIG. 10 after which the die with the remaining material 11a is removed. A new operating cycle is then started.

The billet 12, and the plate 31 or end piece 36, if these are used, constitute an inner body within the casing 13 or 13a. In the case of a billet alone, as in FIGS. 2 to 7, the whole of this inner body is formed of a metal different from that of the casing. In the modifications of FIGS. 8 and 9, where a plate is used, the billet constitutes the portion of the inner body other than the plate, that is, other than the part of the inner body adjacent the end at which the sealing means are provided.

The invention is not limited to the methods described or the embodiments shown. Many modifications and variations are feasible within the scope of the following claims.

I claim:

1. Method of making by hydrostatic extrusion elongated bodies of a compound material having a tubular casing from a billet comprising an inner body of at least one solid metallic material and a solid metallic casing, said inner body having recess means therein, which comprises applying sealing means adjacent a first end of the billet to prevent pressure medium from penetrating between the inner body and the casing, at least the portion of the inner body other than the part adjacent such end being of a different metallic material from that of the casing, pressing the material of the casing into said recess means, whereby positive connection forces between the core and the inner body are produced and the axial forces arising from the differences in molding resistance of the different materials of the said portion of the inner body and the casing so that axial movement of such portion of the inner body in relation to the casing is precluded before entry into a die, and hydrostatically extruding the billet through an opening in a die which is arranged in a pressure chamber with the other end of the billet engaging the die.

2. A method as claimed in claim 1 in which the recess means is in such portion of the inner body.

3. A method as claimed in claim 1, in which the inner body includes a plate at such first end separate from said portion, and said recess means is in said plate.

4. A method as claimed in claim 1, in which the inner body includes a plate at such first end separate from said portion, and said recess means is formed between the plate and said portion.

5. A method as claimed in claim 1, in which the inner body includes a plate at such first end separate from such portion, and said sealing means is positioned between said plate and the casing.

6. Method according to claim 1, in which the sealing means comprises an annular groove in said inner body and a sealing ring in said groove.

7. Method according to claim 1, in which the sealing means comprises an annular groove in said inner body and a sealing ring in said groove, said recess means being spaced apart from said annular groove means.

8. A method according to claim 1, which comprises positioning the rear end surface of the inner body at a distance from and inside the rear end surface of the casing, thereby leaving a recess in the end of the billet, and in which the step of applying sealing means comprises positioning a plate of elastomeric material provided with a flange in the recess with the flange abutting against the inner surface of the casing to prevent the pressure medium in the chamber from penetrating between the casing and the inner body.

9. Method according to claim 1, which comprises positioning the inner body in the casing with its rear end surface at a distance from and inside the rear end surface of the casing, thereby leaving a recess in the end of the billet, and in which the step of applying sealing means comprises positioning a ring having an L-shaped cross-section in the recess with its flanges abutting against both the end surface of the inner body and the inner surface of the casing to prevent the pressure medium in the chamber from penetrating between the casing and the inner body of the billet.

10. A method according to claim 1, which comprises positioning the inner body within the casing with its rear end surface at a distance from and inside of the rear end surface of the casing, thereby leaving a recess in the end of the billet, and in which the step of applying sealing means comprises positioning a plate of metallic material provided with a flange into the recess, and joining the plate flange to the casing of the billet by soldering or welding.

11. A method according to claim 1, which comprises positioning the inner body within the casing with its rear end surface at a distance from and inside the rear end surface of the casing, thereby leaving a recess in the end of the billet, and in which the step of applying sealing means comprises positioning a plate in the recess having an annular groove therein, and a sealing ring in the groove, to prevent the pressure medium in the chamber from penetrating between the casing and the inner body of the billet.

12. A method according to claim 1, in which said recess means comprises providing an annular groove in the inner body and such pressing comprises forcing the casing material into the groove by isostatic compression.

13. Method according to claim 1, in which the step of pressing the material into the recess means comprises increasing the pressure level in the chamber to the level required for the extrusion.

14. Method according to claim 1, including the step of joining the remaining material comprising the casing and such portion of the inner body of a previously pressed billet to a new casing and inner body to form a new billet.

15. Method according to claim 14, which comprises shaping one end of such portion of the inner body with a projecting part and the other end of such portion of the inner body with a recess congruent to the projecting part, and inserting the projecting part of such portion of the new inner body into the recess of such portion of the remaining material.

16. Method as claimed in claim 1, which comprises forming such portion of the inner body of aluminum and the casing of copper and extruding with an area reduction ratio which exceeds 50.

17. Method according to claim 1, which comprises forming the casing of copper and such portion of the inner body of aluminum and extruding with an area reduction ratio between 100 and 1000.

References Cited

UNITED STATES PATENTS

| | | | |
|---|---|---|---|
| 3,150,936 | 9/1964 | Hunt | 29—187.5 |
| 3,286,337 | 11/1966 | Sauve | 72—270 X |
| 3,413,707 | 12/1968 | Klein et al. | 29—420.5 |
| 3,344,507 | 10/1967 | Green | 29—420.5 |
| 3,397,562 | 8/1968 | Fuchs, Jr. | 72—54 |

RICHARD J. HERBST, Primary Examiner

U.S. Cl. X.R.

72—253; 29—187.5, 422

UNITED STATES PATENT OFFICE
CERTIFICATE OF CORRECTION

PATENT NO. : 3,620,059
DATED : November 16, 1971
INVENTOR(S) : Jan Nilsson

It is certified that error appears in the above-identified patent and that said Letters Patent are hereby corrected as shown below:

Column 10, line 9, cancel "core" and insert --casing--.

Signed and Sealed this

Twenty-third Day of October 1979

[SEAL]

Attest:

RUTH C. MASON
Attesting Officer

LUTRELLE F. PARKER
Acting Commissioner of Patents and Trademarks